Oct. 8, 1940.     A. STIHL     2,217,145
SAW SHARPENING MACHINE
Filed Dec. 29, 1937     3 Sheets-Sheet 1

Inventor:
Andreas Stihl
Albert F. Dieterich
and
by Theodore H. Rutley
Attys.

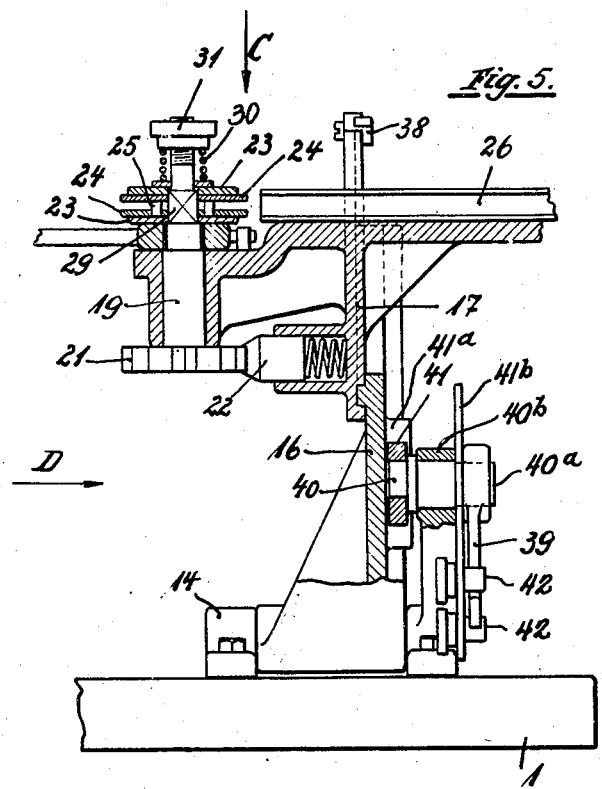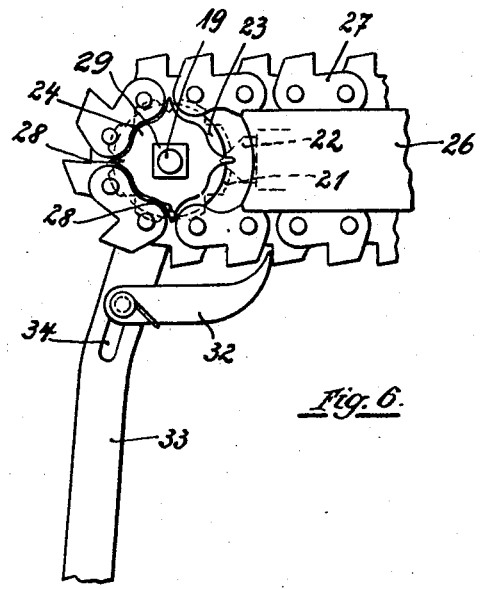

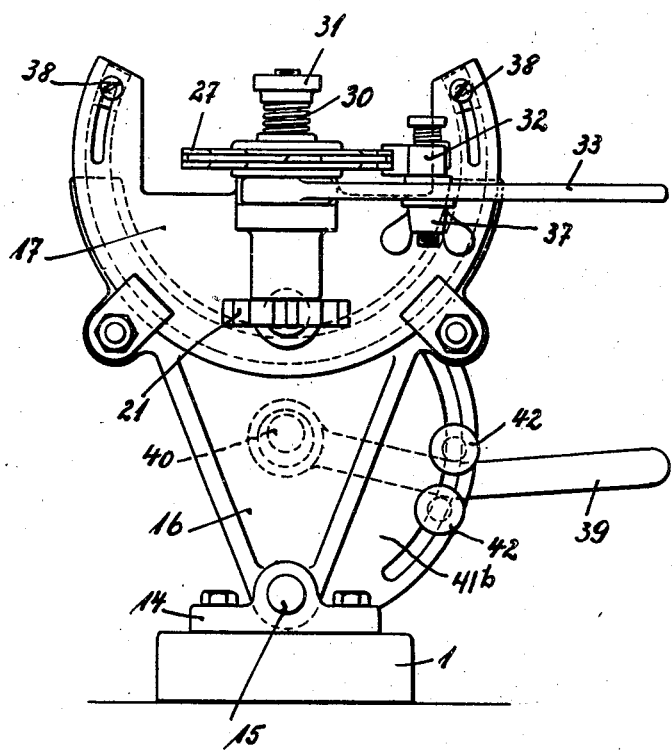

Patented Oct. 8, 1940

2,217,145

UNITED STATES PATENT OFFICE 2,217,145

SAW SHARPENING MACHINE

Andreas Stihl, Stuttgart, Germany

Application December 29, 1937, Serial No. 182,314
In Germany January 21, 1937

19 Claims. (Cl. 51—98)

My invention relates to saw sharpening machines and more especially to machines for sharpening the teeth of chain saws, in which each link of the chain constitutes a tooth.

It is an object of my invention to provide a machine of this kind which is more efficient and can be handled more easily than similar machines hitherto devised.

In machines for sharpening the front faces of saw teeth, as hitherto suggested, a grinding wheel carrier is arranged for displacement above the saw guide. By adjusting this carrier, the angle of the cutting edge of the teeth can be determined according to requirements.

In the machine according to the present invention, several parts are designed to co-operate in such manner that the teeth of link tooth saws can be ground with great accuracy. To this end the chain saw is guided on a sprocket wheel arranged below the grinding wheel carrier, this sprocket wheel being formed with teeth corresponding to the pitch of the saw teeth and being supported in a bracket which can turn about an axis at right angles to the sprocket wheel axle.

The chain is here guided in such manner that its individual links are carried, one after the other, into a position relative to the grinding wheel, in which their base line extends exactly in the horizontal. By means of a notched wheel mounted on the sprocket wheel axle, and acted upon by a resilient intermediate member, the guide wheel is fixed in the position in which the chain links shall be machined.

According to the invention, the parts are so arranged that only the rough adjustment of the thickness of the cuttings is effected by a corresponding displacement of the grinding wheel, while the fine adjustment is brought about by an eccentrical displacement of the bracket carrying the sprocket wheel. Adjustable checks are provided for the purpose of keeping up the adjustment without any change for all the links of the chain.

With these and other objects in view, I will now describe my invention with reference to the drawings affixed to this specification and forming part thereof, in which a machine embodying my invention is shown diagrammatically by way of example.

In the drawings:

Figure 5 is a cross section, drawn to a larger scale, on the line B—B in Fig. 1, however showing the parts in a position displaced 90° with respect to the showing of Figs. 1 and 2.

Figure 6 illustrates the means for guiding and adjusting the saw, which are shown in the top portion of Fig. 5, viewed in the direction of the arrow C and with the outer holding means removed.

Figure 7 is a side elevation of the parts shown in Fig. 5, viewed in the direction of the arrow D.

Figure 1:
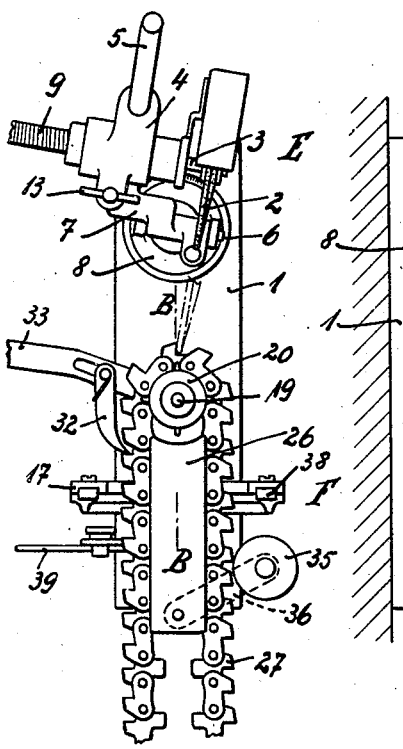
Figure 1 is a partial front view of the machine with part of a linked tooth chain in position thereon.
Figure 2:
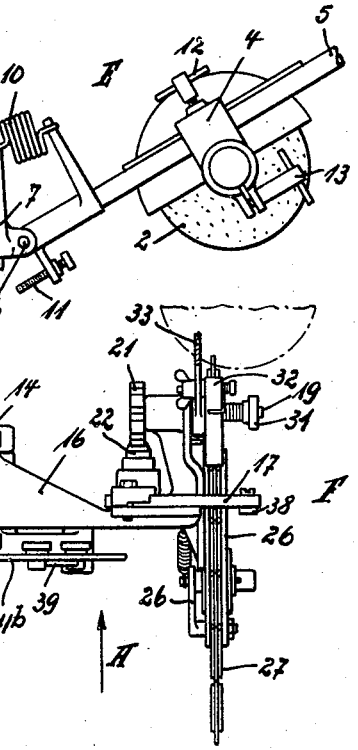
Figure 2 is a side elevation.

Referring to the drawings and first to Figs. 1 and 2, the machine consists of two separate parts E and F, each of which is fixed, by screwing or otherwise, on the bed plate 1, which may be mounted in vertical position on a wall, a column, a pillar or the like.

The top part E carries the grinding wheel 2 and the means for driving and adjusting it. The driving shaft 3 of the grinding wheel is supported for axial displacement in the grinding wheel carrier 4, which is mounted for displacement in a plane extending at right angles to the grinding wheel axis on the one-armed lever 5, which is mounted for rocking motion about a pin 6 on a bracket 7, which is connected with a turntable 8 on the bed plate 1.

The turntable is provided with a graduation which allows of nicely adjusting the angular position of the grinding wheel and consequently also the angle of the cutting edge of the saw teeth.

The grinding wheel is driven in a well-known manner by means of a flexible shaft 9 (Fig. 1), which may, for instance, be connected to a motor (not shown) also mounted on the wall in such manner that the bottom end of the flexible shaft can be connected to the grinding wheel shaft in horizontal position.

The grinding wheel carrier is held in lifted position by a coil spring 10 and is carried into operative position, against the action of the spring, by exerting pressure on the rod 5.

A set screw 11 is provided for adjusting the lower end position of the grinding wheel, which determines the depth of grinding. The grinding wheel carrier 4 is fixed on the lever 5 by a clamping screw 12 and the grinding wheel support on the grinding wheel carrier by means of the screw 13.

The part F, serving to guide and adjust the chain saw to be sharpened, mainly consists of a bracket 14 (Figs. 2 and 5) fixed to the bed plate 1 of the carrier 16 mounted on the bracket 14 for rocking motion about a pivot 15 and carrying a bracket 17 which supports the bearings for the sprocket wheel shaft 19 and the double rail 26 which serves to guide the chain saw 27.

On the shaft 19 are mounted the sprocket wheel 20 and a notched wheel 21, into the gaps of which a pawl 22 enters automatically under the action of a comparatively powerful coil spring.

The sprocket wheel is shown, in Figs. 5 and 6, to consist of two outer covering disks 23 and two toothed discs 24, which are held in spaced relation by means of bolts 25.

The circumference of the guide disks 24 is so shaped that the outer chain links apply themselves thereon with their inner edges, the guide members of the chain links being enclosed between the two inner disks 24 which project with guide fingers 28 into the gaps between the chain links and thereby carry these links along when the shaft 19 is rotated.

The shaft is formed, to this end, with a square portion 29 on which are seated the several disks. A spring 30, which may be compressed at will by means of a nut 31, forces the disks of the sprocket wheel against each other so that they firmly hold the chain saw mounted on the wheel.

The pitch of the sprocket is made to agree with the chain pitch in such manner that, with each adjustment stroke covering one chain link, the following link is made to adjust itself in an exactly horizontal position below the grinding wheel, this exact position being kept up by the notched wheel.

In order that, also, the scraper teeth enclosed between the outer teeth of the saw may be ground, the notched wheel 21 is preferably formed with twice the number of notches than the sprocket wheel.

The chain saw is moved by means of the pawl 32 which, in the operative position, applies itself resiliently against a front face of a tooth, as shown in Figs. 1 and 6, and can be forced downwardly by the lever 33 in such manner that the chain is displaced by one tooth.

By thereafter lifting the lever again, the pawl is introduced into the following gap between the teeth. For the purpose of mounting and dismounting the chain, the pawl 32 may be shifted rearwardly from its operative position in the slit 34 of the lever, after the screw 37 (Fig. 7) has been loosened.

The chain saw is then placed in position in such manner that its inwardly projecting fingers enter the notches of the chain slide 26 (Fig. 5). The slide roller 35 (Fig. 1), which is mounted for displacement on a spring-acted lever 36, forces the chain against the rail.

For the purpose of adjusting the cutting angle of the teeth, the bracket 17 (Figs. 2, 3 and 7), which carries the sprocket wheel shaft, is turned, its end position being fixed in either direction by means of checks 38 adjustable in slots of the bracket.

In order to set the wheel for a uniform thickness of the cuttings, the grinding wheel carrier 4 is first displaced on the lever 5 to assume the correct position and, at the same time, the lateral adjustment of the grinding wheel support in the grinding wheel holder is effected and the support fixed in this position by means of the screws 12 and 13 (Fig. 2).

Figure 4:
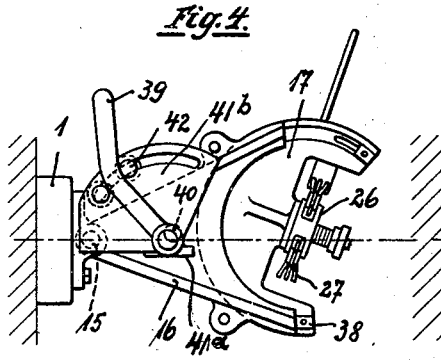
Figure 4 is a similar view of this device, shown, however, in another position of the bracket carrying the sprocket wheel.
Figure 3:
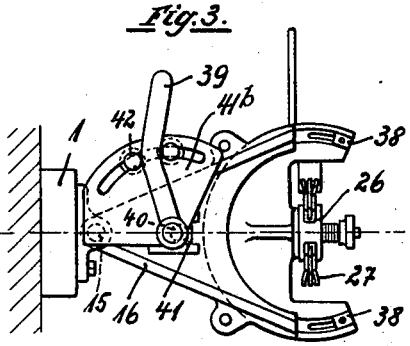
Figure 3 is an elevation of the means for guiding the chain saw, viewed in the direction of arrow A in Fig. 2.

The exact thickness of the cuttings is then determined by adjusting the oscillatable carrier 16 by means of the lever 39 (Figs. 3 and 4). This lever is adapted to rotate a vertical shaft 40a journalled in the outer end of a supporting arm 40b extending outwardly from the bracket 14 beneath the carrier 16. An eccentric 40 projects from the upper end of the shaft 40a into a slide block 41 located between spaced-apart, parallel guides or ribs 41a formed on the lower surface of the carrier 16. When the lever 39 is in the position shown in Figure 3, the ribs 41a lie substantially parallel to the centre line of the figure but when the lever is moved into the position shown in Figure 4, the eccentric 40, through the slide block 41, causes the carrier 16 to pivot about the pin 15, thus moving the rib 41a shown in Figure 4 in one direction. When the lever 39 is moved to the other extreme position, the carrier 16 is pivoted in the opposite direction. As the carrier moves, so moves the bracket 17 so that the chain tooth may be brought into any desired position relative to the grinding wheel.

After the sharpening of the first tooth, this position is then fixed by means of the checks 42 (Fig. 7). These checks extend through an arcuate slot 47 formed in an adjusting member 41b carried by the arm 40b. Figs. 3 and 4 show two different positions of the carrier 16 and the bracket 17.

By means of this machine the cutting teeth, as well as the inner and outer scraper teeth, can be sharpened in direct succession and, by alternating adjustment of the bracket 17 also scraper teeth with varying inclination of the faces to be ground can be machined in succession.

I wish it to be understood that I do not desire to be limited to the exact details of construction shown and described, for obvious modifications will occur to a person skilled in the art.

Having now described my invention and the nature of same, what I claim and desire to be protected in, by Letters Patent, is:

1. A machine for sharpening the teeth of link tooth saws, comprising in combination, a grinding wheel carrier, a saw supporting sprocket arranged below said grinding wheel carrier, the pitch of said sprocket corresponding to the pitch of the teeth of the saw, a support for said sprocket, means to mount said support for rocking motion about an axis normal to the axis of the sprocket, means for guiding the chain so that the individual chain links are carried successively into a position, relative to the grinding wheel, in which their base line extends exactly in a horizontal direction, and means to check said sprocket in its said rocking motion to the end positions of its adjustments.

2. The machine of claim 1, in which a notched wheel is arranged coaxially with the sprocket to fix the sprocket in the sharpening positions of the chain links, a detent arranged for coaction with said notched wheel.

3. The machine of claim 1, in which the sprocket comprises two disks arranged in spaced relation and formed to fit the chain links and guide pins associated with said disks projecting between the chain links, said disks also serving to coact with extensions formed on the chain links.

4. The machine of claim 1, in which the sprocket comprises a pair of disks, a journal forming a common support for said disks and resilient means for pressing said disks towards each other.

5. The machine of claim 1, in which a notched wheel is provided, and a spring-acted pawl is arranged to transport the chain together with the sprocket and notched wheel.

6. The machine of claim 1, in which the grinding wheel is mounted for axial displacement relative to its carrier.

7. The machine of claim 1, in which the sprocket support comprises an oscillatable arm, a semi-circular guide on said arm and a semi-circular sprocket axle carrier rotatably mounted in said guide.

8. The machine of claim 1, in which the sprocket support comprises an oscillatable arm, a semi-circular guide on said arm and a semi-circular sprocket axle carrier rotatably mounted in said guide, in combination with a slotted adjusting member, a bracket, an eccentric journaled in said bracket, a lever secured to said eccentric, and means for fixing said lever in different positions relative to said member.

9. The machine of claim 1 in which a spring and a check are provided for holding said grinding wheel carrier in inoperative position and for limiting its operative end position, respectively.

10. The machine of claim 1, in which a slotted rail is provided for guiding the chain saw to be sharpened.

11. A machine for sharpening the teeth of link tooth saws, including a bed plate, a grinding wheel carrier, a grinding wheel having a shaft journalled in said carrier, means whereby said shaft may be axially moved in and held by said carrier, a turntable mounted on said bed plate to turn on a horizontal axis, a one armed lever pivoted to said turntable on an axis at right angles to said turntable's axis, means to secure said carrier on said lever for adjustment along the length of the lever, the shaft of said grinding wheel being disposed in a plane normal to said lever, and means to hold a link tooth saw in position beneath said grinding wheel.

12. A machine for sharpening the teeth of link tooth saws, comprising a movable grinding wheel carrier, a grinding wheel carried thereby, and means to support a link tooth saw below said grinding wheel for cooperation therewith, said means including a laterally adjustable saw carrier, a bracket mounted on said saw carrier for oscillatable movement on a vertical axis from one position to another, a sprocket wheel shaft mounted on a horizontal axis in said bracket, a saw sustaining sprocket having a pitch corresponding to the pitch of the teeth of the saw and being mounted on said sprocket wheel shaft, means cooperating with said sprocket wheel shaft for advancing the saw to bring successive teeth into position for being operated upon by said grinding wheel, and means for holding the sprocket wheel against accidental displacement.

13. A machine for sharpening the teeth of link tooth saws, comprising a movable grinding wheel carrier, a grinding wheel carried thereby, and means to support a link tooth saw below said grinding wheel for cooperation therewith, said means including a laterally adjustable saw carrier, a bracket mounted on said saw carrier for oscillatable movement on a vertical axis from one position to another, a sprocket wheel shaft mounted on a horizontal axis in said bracket, a saw sustaining sprocket having a pitch corresponding to the pitch of the teeth of the saw and being mounted on said sprocket wheel shaft, means cooperating with said sprocket wheel shaft for advancing the saw to bring successive teeth into position for being operated upon by said grinding wheel, and means for holding the sprocket wheel against accidental displacement, said last named means comprising a notched wheel, and a detent engaging the notches of said wheel.

14. A machine for sharpening the teeth of link tooth saws, comprising a movable grinding wheel carrier, a grinding wheel carried thereby, and means to support a link tooth saw below said grinding wheel for cooperation therewith, said means including a laterally adjustable saw carrier, a bracket mounted on said saw carrier for oscillatable movement on a vertical axis from one position to another, a sprocket wheel shaft mounted on a horizontal axis in said bracket, a saw sustaining sprocket having a pitch corresponding to the pitch of the teeth of the saw and being mounted on said sprocket wheel shaft, means cooperating with said sprocket wheel shaft for advancing the saw to bring successive teeth into position for being operated upon by said grinding wheel, and means for holding the sprocket wheel against accidental displacement, and means to effect the lateral adjustments of said saw carrier and hold it in its different adjustment positions.

15. A machine for sharpening the teeth of link tooth saws, comprising a movable grinding wheel carrier, a grinding wheel carried thereby, and means to support a link tooth saw below said grinding wheel for cooperation therewith, said means including a laterally adjustable saw carrier, a bracket mounted on said saw carrier for oscillatable movement on a vertical axis from one position to another, a sprocket wheel shaft mounted on a horizontal axis in said bracket, a saw sustaining sprocket having a pitch corresponding to the pitch of the teeth of the saw and being mounted on said sprocket wheel shaft, means cooperating with said sprocket wheel shaft for advancing the saw to bring successive teeth into position for being operated upon by said grinding wheel, and means for holding the sprocket wheel against accidental displacement, and means to effect the lateral adjustments of said carrier and hold it in its different adjustment positions, said last named means comprising a lever and an eccentric and adjustable stops for holding the lever in its adjusted positions.

16. A machine for sharpening the teeth of link tooth saws, comprising a movable grinding wheel carrier, a grinding wheel carried thereby, and means to support a link tooth saw below said grinding wheel for cooperation therewith, said means including a laterally adjustable saw carrier, a bracket mounted on said saw carrier for oscillatable movement on a vertical axis from one position to another, a sprocket wheel shaft mounted on a horizontal axis in said bracket, a saw sustaining sprocket having a pitch corresponding to the pitch of the teeth of the saw and being mounted on said sprocket wheel shaft, means cooperating with said sprocket wheel shaft for advancing the saw to bring successive teeth into position for being operated upon by said grinding wheel, and means for holding the sprocket wheel against accidental displacement, said sprocket comprising two discs, means to space the discs a distance apart to accommodate the chain links and to pass between the discs extensions formed on the chain link.

17. A machine for sharpening the teeth of link tooth saws, comprising a movable grinding wheel carrier, a grinding wheel carried thereby, and means to support a link tooth saw below said grinding wheel for cooperation therewith, said means including a laterally adjustable saw carrier, a bracket mounted on said saw carrier for oscillatable movement on a vertical axis from one position to another, a sprocket wheel shaft mounted on a horizontal axis in said bracket, a saw sustaining sprocket having a pitch corresponding to the pitch of the teeth of the saw and being mounted on said sprocket wheel shaft, means cooperating with said sprocket wheel shaft for advancing the saw to bring successive teeth into position for being operated upon by said grinding wheel, and means for holding the sprocket wheel against accidental displacement, said sprocket comprising two discs, means to space the discs a distance apart to accommodate the chain links and to pass between the discs extensions formed on the chain link, said sprocket wheel shaft having a squared portion to receive said discs and having a shoulder against which one of said discs abuts and an adjustable tension spring mounted on said sprocket wheel shaft to press said discs together against said shoulder.

18. A machine for sharpening the teeth of link tooth saws, comprising a movable grinding wheel carrier, a grinding wheel carried thereby, and means to support a link tooth saw below said grinding wheel for cooperation therewith, said supporting means comprising an oscillatable member, a semi-circular guide on said member and a semi-circular sprocket axle carrier oscillatably mounted in said guide in combination with a slotted member, a bracket, an eccentric journalled in said bracket, a lever secured to said eccentric, and means for fixing said lever in different positions relative to said slotted member.

19. A machine for sharpening the teeth of link tooth saws, comprising a movable grinding wheel carrier, a grinding wheel carried thereby, and means to support a link tooth saw below said grinding wheel for cooperation therewith, said supporting means comprising an oscillatable member, a semi-circular guide on said member and a semi-circular sprocket axle carrier oscillatably mounted in said guide in combination with a slotted member, a bracket, an eccentric journalled in said bracket, a lever secured to said eccentric, and means for fixing said lever in different positions relative to said slotted member, and means to limit the degree of oscillatory movement of said axle carrier in said guide.

ANDREAS STIHL.